A. E. LOGAN.
WHEEL RIM.
APPLICATION FILED APR. 22, 1919.

1,340,901.

Patented May 25, 1920.

Inventor:
A. E. Logan,
by Lacey & Lacey,
Attys.

UNITED STATES PATENT OFFICE.

ALBERT E. LOGAN, OF BROOKLYN, NEW YORK.

WHEEL-RIM.

1,340,901.   Specification of Letters Patent.   Patented May 25, 1920.

Application filed April 22, 1919. Serial No. 291,835.

*To all whom it may concern:*

Be it known that I, ALBERT E. LOGAN, a citizen of the United States, residing at Brooklyn, in the county of Kings and State of New York, have invented certain new and useful Improvements in Wheel-Rims, of which the following is a specification.

This invention relates to automobile wheel rims and more particularly to an improvement in demountable rims for supporting clencher tires.

The primary object of the present invention is to provide a rim to which the tire may be readily and conveniently fitted and from which it may be equally as readily removed thus avoiding the tedious and laborious working of a tire from its rim as is at present necessary where the rims are of integral or one piece structure.

Briefly stated the rim embodying the present invention comprises two annular sections disposable edge to edge, and it is one object of the present invention to provide novel means for locking these sections in their assembled relation so that they cannot become relatively laterally displaced or separated.

Another object of the invention is to provide means for preventing dust entering between the meeting edges of the two rim sections.

A further object of the invention is to provide means whereby one section may be caused to rotate with relation to the other section in the event the locking means becomes rusted or clogged to an extent to prevent ready relative rotation of the sections merely by hand.

Figure 1:
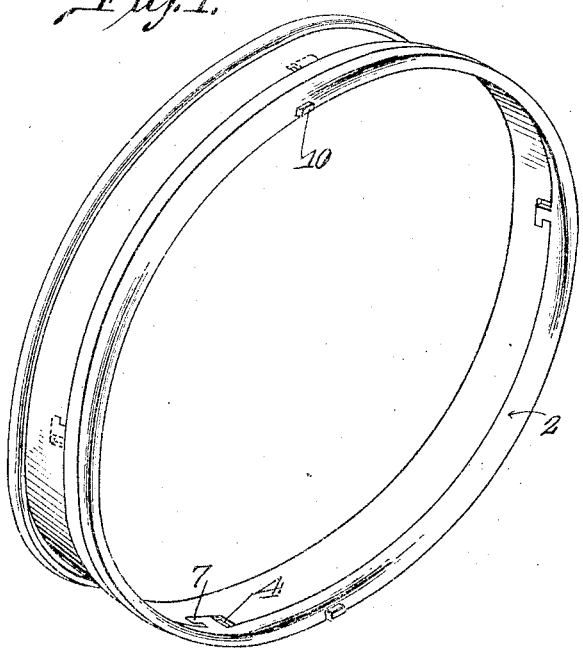
Figure 1 is a perspective view of the rim embodying the present invention.
Figure 3:
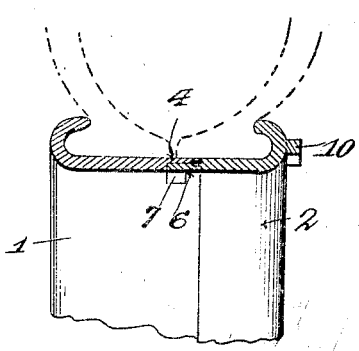
Fig. 3 is a transverse sectional view through the rim in the plane of one of the locking devices for preventing relative lateral separation of the rim sections.
Figure 4:
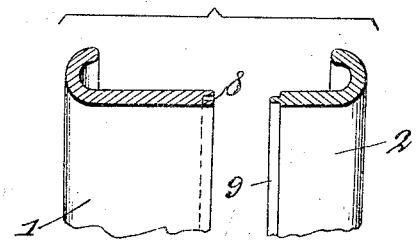
Fig. 4 is a similar view illustrating the sections separated and showing the means provided for preventing entrance of dust and dirt between the meeting edges of the sections.

The wheel rim embodies two sections one indicated in general by the numeral 1 and the other in general by the numeral 2, the section 1 being preferably although not necessarily the wider section. Each of these sections is of annular form and is provided at its outer lateral edge with the usual flange 3 to engage the tire bead. In other words, these two sections have the form of the parts which would result if the ordinary rim were split circumferentially. Consequently in order to adapt the rim for use, it is necessary that the inner lateral edges of the two sections be brought into mutually abutting relation as shown most clearly in Figs. 1 and 3 of the drawings. This is, of course, accomplished after the sections have had their flanges 3 engaged with the opposite beads of the tire casing to be supported upon the rim, and in order that the sections may be held thus assembled, means is provided which will now be described.

Figure 2:
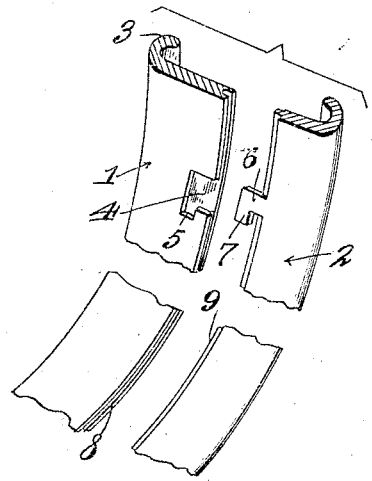
Fig. 2 is a fragmentary sectional perspective view illustrating the sections of the rim in position about to be assembled.

The section 1 at suitable intervals in its circumference, is formed in its inner side with recesses 4 which have the general form of the well-known bayonet slot, each recess having the lateral extension 5 which in this instance extends in the direction of the circumference of the rim section. These recesses 4 open inwardly through the inner lateral edge of the said section 1 and are designed to receive locking heads 6 formed at corresponding intervals circumferentially upon the corresponding or inner lateral edge of the section 2 as clearly shown in Figs. 2 and 3 of the drawings, the locking heads 6 being each provided with a lateral extension or nose 7 and the recesses 4 at their ends which open through the inner lateral edge of the section 1 being of a width sufficient to permit of the entrance of the nose carrying ends of the said locking heads 6 when the rim sections are brought together laterally. When the sections are brought together in this manner the locking heads will, of course, enter the recesses 4, and then if the sections are relatively rotated, the noses 7 of the said locking heads will be caused to enter the extensions 5 of the respective recesses 4 and by reason of their engagement in these extensions of the recesses will effectually lock the two sections of the rim against relative lateral separation. Of course, in removing the tire from the rim the sections are to be relatively rotated in the reverse direction so that the noses 7 of the locking heads will recede from the extensions 5 of the respective recesses 4 and then the resiliency of the supported tire will serve to separate the said sections as the tire expands and, of course, the sections may then be readily independently removed from the tire.

In order to prevent dust and dirt entering between the meeting edges of the sections when the said sections are assembled and which foreign matter might eventually enter the tire casing and cause injury to the inner tube, the inner edge of the section 1 is formed throughout its entire length with a groove or channel 8 and the section 2 is formed upon its corresponding edge with a laterally projecting continuous flange 9, which, when the sections are assembled, is designed to seat snugly within the said groove or channel 8 thus effectually closing the space which would otherwise be present to a greater or less degree between the meeting edges of the said sections.

In order that the section 2 of the rim may be rotated with relation to the section 1 in the event the locking means heretofore described become clogged or stick for any other reason so as to render such rotation difficult by hand alone, the flanged edge of the said section 2 is preferably provided with one or more lugs 10 against which blows may be struck by a hammer or the like so as to loosen the parts.

Having thus described the invention, what is claimed as new is:

A tire rim including wide and narrow annular sections having means for engaging the bead of a tire, the meeting edges of said sections being provided with an interfitting continuous tongue and groove, said wide section being provided with bayonet slots in its inner face, L-shaped locking lugs carried by the inner edge of said narrow section and adapted to be received within said bayonet slots, said bayonet slots and said L-shaped locking lugs being spaced inwardly from the outer face of the rim to provide a smooth bearing surface for a tire, and a striking device carried by one of said sections and projecting laterally from the same.

In testimony whereof I affix my signature.

ALBERT E. LOGAN. [L. S.]